L. D. McELROY.
SLACK ADJUSTER FOR BRAKES.
APPLICATION FILED JUNE 10, 1911.
1,007,474.
Patented Oct. 31, 1911.
2 SHEETS—SHEET 1.
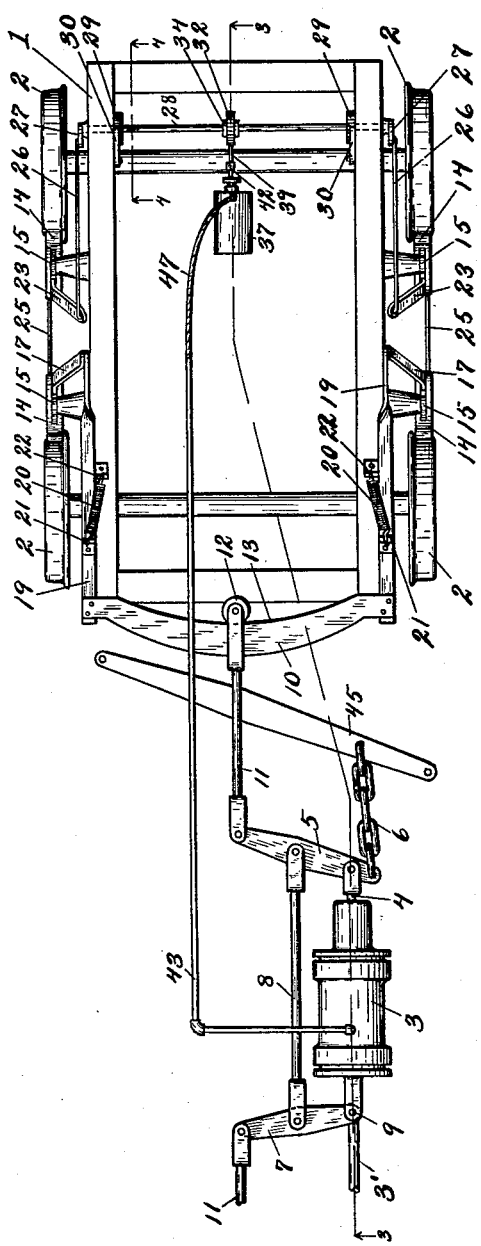
Fig. I.
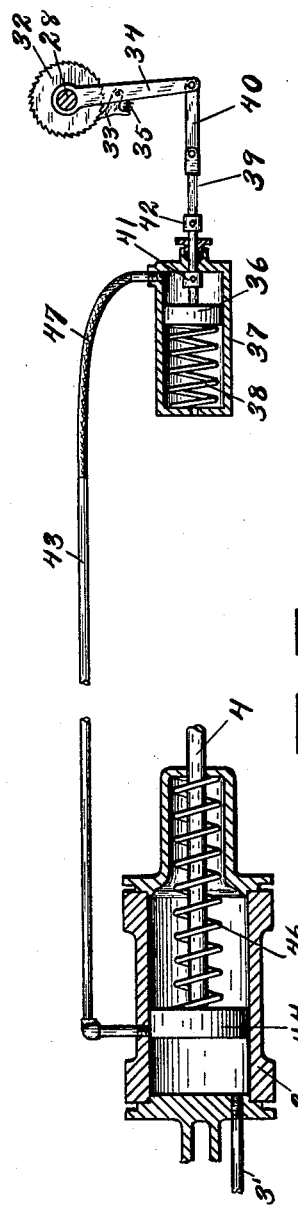
Fig. III.

L. D. McELROY.
SLACK ADJUSTER FOR BRAKES.
APPLICATION FILED JUNE 10, 1911.
1,007,474.
Patented Oct. 31, 1911.
2 SHEETS—SHEET 2.
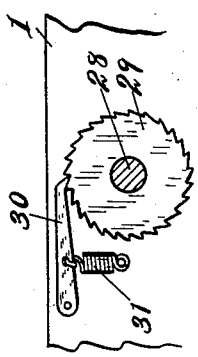
Fig. IV.
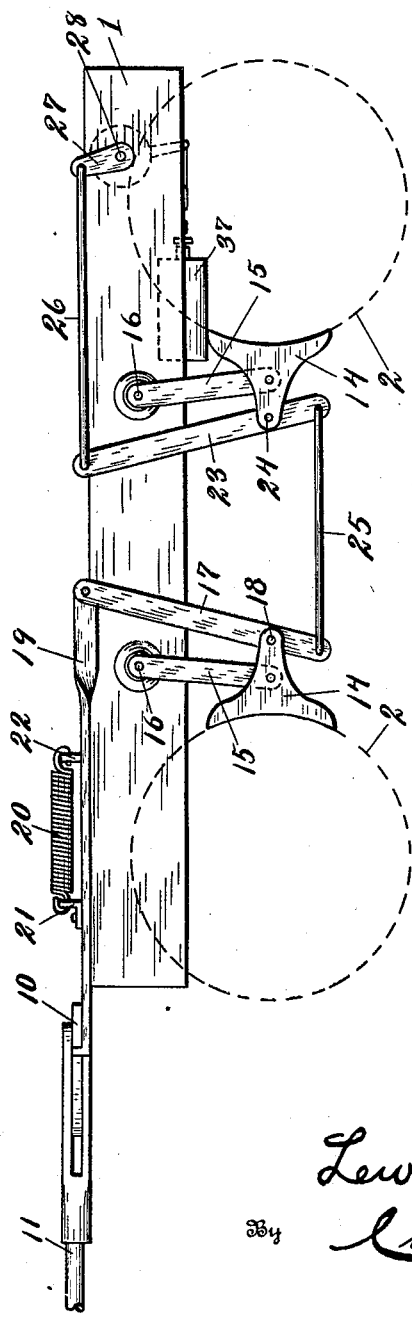
Fig. II.

UNITED STATES PATENT OFFICE.

LEWIS D. McELROY, OF KALAMAZOO, MICHIGAN, ASSIGNOR OF ONE-HALF TO WILLIAM H. BENNETT, OF KALAMAZOO, MICHIGAN.

SLACK-ADJUSTER FOR BRAKES.

1,007,474. Specification of Letters Patent. Patented Oct. 31, 1911.

Application filed June 10, 1911. Serial No. 632,460.

*To all whom it may concern:*

Be it known that I, LEWIS D. McELROY, a citizen of the United States, residing at the city of Kalamazoo, county of Kalamazoo, and State of Michigan, have invented certain new and useful Improvements in Slack-Adjusters for Brakes, of which the following is a specification.

This invention relates to improvements in slack adjusters for brakes.

The main objects of this invention are, first, to provide an improved automatic slack adjuster for brakes. Second, to provide an improved automatic slack adjuster which is reliable and positive in its action. Third, to provide an improved automatic slack adjuster which requires but little structural change in brakes now in quite common use in order to permit its application or embodiment. Fourth, to provide an improved automatic slack adjuster for brakes which is not likely to get out of repair.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this invention, in which:

Figure I is a detail plan view of a structure embodying the features of my invention, one truck only being shown, and this mainly in conventional form. Fig. II is a side elevation of the truck appearing in Fig. I, the wheels being indicated by dotted lines. Fig. III is a detail vertical section taken on a line corresponding to line 3—3 of Fig. I, through the air brake cylinder 3 and the adjuster cylinder 37. Fig. IV is an enlarged detail section taken on a line corresponding to line 4—4 of Fig. I, showing the detent for the shaft 28.

In the drawing, similar reference characters refer to similar parts throughout the several views, and the sectional views are taken looking in the direction of the little arrows at the ends of the section lines.

Referring to the drawing, the truck frame 1 is shown in conventional form. The air brake cylinder 3 is supplied with air through the pipe 3′ which delivers into the inner end of the cylinder, (see Fig. III). The piston rod 4 of the piston 44 is connected to the live cylinder lever 5. One end of this lever is connected by the chain 6 to the lever 45, which is connected to the hand power, the connections not being illustrated as they form no part of this invention.

The live cylinder lever 5 is connected to the dead cylinder lever 7 by means of the link or rod 8. The lever 7, in the structure illustrated, is pivoted on a bracket on the head of the cylinder 3 at 9. The brake shoes 14 are supported by the hangers 15, which are pivoted on the frame at 16. The live truck levers 17 are connected to one shoe of each pair by the pivots 18, and to the live cylinder lever by the links or rods 19, the connecting cross piece 10 therefor and the rod or link 11 on the live cylinder lever 5. The rod 11 is provided with a roller 12 which travels on a suitable curved way 13 on the cross piece 10. This permits the turning of the truck without affecting the connections. Springs 20 connected to the rods 19 at 21 and to the truck frame at 22 are provided for holding the brake shoes in their disengaged positions.

The dead truck levers 23 are connected to the other shoes by the pivots 24 and by the links or rods 26 to the arms 27 on the supporting shaft 28. This supporting shaft 28 is the adjustable support or take up member of the brake operating connections. The shaft or take up member 28 is held in its adjusted positions by the ratchet wheels 29 and the detents 30, (see Figs. I and IV). The detents are provided with springs 31. The levers 17 and 23 are connected by the link or rod 25. With the parts thus connected, it will be clear that when the piston 44 is actuated, the brakes are set. The piston 44 is returned by means of the spring 46 arranged in the outer end of the cylinder 3.

The adjusting means for the take up member 28 comprises the adjuster cylinder 37, one end of which is connected to the air brake cylinder 3 by means of the pipe 43, the connection opening into the cylinder 3 at a point spaced from its inner end so that the adjuster cylinder 37 is not connected with the air unless the piston 44 exceeds a predetermined length of stroke.

The piston rod 39 of the piston 36 is connected by the link 40 to the lever 34 pivotally mounted on the shaft 28. On this lever 34 is a pawl 33 arranged to coact with a ratchet wheel 32 (see Fig. III) secured to the lever. The stroke of the piston 36 is regulated by the adjustable stop collars 41 and 42 on the piston rod 39. The pawl 33 is provided with a spring 35. The piston 36 is provided with a return spring 38. The connection 43, in the structure illustrated, has a flexible portion 47, as the cylinder 30 is mounted on the car body, while the cylinder 37 is mounted on the truck.

With the parts thus arranged, in the event of there being sufficient slack in the connections to permit it, the piston 44 moves within the cylinder 3 and thus permits the air under pressure to pass into the inner end of the cylinder 37. As soon as the brakes are released, the piston 44 moves back to its normal position. This application of the brakes permits the air to actuate the piston 36 against the spring 38, and, through the connections described, acts on the take up member 28. As soon as the piston 44 in its return movement moves past the opening of the connection 43 into the cylinder 3, the air in the cylinder 37 is exhausted into the outer end of the cylinder 3 and the piston 36 returned to its normal position by the spring 38. The slack in the brake is thus automatically taken up. This constant taking up of any slack that may occur through wear or other causes, is a highly desirable feature, as many accidents are caused, particularly in street railway operation, on account of the slack in the brakes.

I have illustrated and described my improved automatic slack adjuster largely in conventional form, as that is sufficient to illustrate its application. While I am aware that various structural modifications are possible, I have not attempted to illustrate or describe them, as I believe they will be readily understood by those skilled in the art to which this invention relates. Other types of brakes would, of course, require to some extent at least, a rearrangement of the parts and connections.

Having thus described my invention, what I claim as new and desire to secure by Letters Patent is:

1. In a structure of the class described, the combination with the truck; of pairs of brake shoes; supporting links therefor; a pair of dead truck levers connected to one shoe of each pair; a pair of live truck levers connected to the other shoes; a coupling rod for said levers; a brake cylinder; a piston therefor; suitable connections for said piston to said live truck levers; a shaft having a pair of arms thereon mounted on said truck; connecting rods for said dead truck levers to said shaft arms; an adjuster cylinder mounted on said truck; a connection for said adjuster cylinder to said brake cylinder, opening into said brake cylinder at a point spaced from its inner end so that the adjuster cylinder is connected with the air supply only when the stroke of the brake piston exceeds a predetermined length, a piston for said adjuster cylinder; a piston rod therefor having adjustable stops thereon; a return spring for said adjuster cylinder piston; a ratchet wheel on said shaft; a pawl lever connected to said piston rod mounted on said shaft; a pawl on said lever coacting with said ratchet; and a detent and ratchet for said shaft.

2. In a structure of the class described, the combination with the truck; of pairs of brake shoes; supporting links therefor; a pair of dead truck levers connected to one shoe of each pair; a pair of live truck levers connected to the other shoes; a coupling rod for said levers; a brake cylinder; a piston therefor; suitable connections for said piston to said live truck levers; a shaft having a pair of arms thereon mounted on said truck; connecting rods for said dead truck levers to said shaft arms; an adjuster cylinder mounted on said truck; a connection for said adjuster cylinder to said brake cylinder, opening into said brake cylinder at a point spaced from its inner end so that the adjuster cylinder is connected with the air supply only when the stroke of the brake piston exceeds a predetermined length, a piston for said adjuster cylinder; a piston rod therefor; a return spring for said adjuster cylinder piston; a ratchet wheel on said shaft; a pawl lever connected to said piston rod mounted on said shaft; a pawl on said lever coacting with said ratchet; and a detent and ratchet for said shaft.

3. In a structure of the class described, the combination with the truck; of the dead truck levers; live truck levers; suitable connections for said levers; a brake cylinder; a piston therefor; suitable connections for said piston to said live truck levers; a shaft having a pair of arms thereon mounted on said truck, said dead truck levers being connected to said shaft arms; an adjuster cylinder mounted on said truck; a connection for said adjuster cylinder to said brake cylinder, opening into said brake cylinder at a point spaced from its inner end so that the adjuster cylinder is connected with the air supply only when the stroke of the brake piston exceeds a predetermined length; a piston for said adjuster cylinder; a piston rod therefor having adjustable stops thereon; a return spring for said adjuster cylinder piston; a ratchet wheel on said shaft; a pawl lever connected to said piston rod mounted on said shaft; a pawl on said lever coacting with said ratchet; and a detent and ratchet for said shaft.

4. In a structure of the class described, the combination with the truck; of the dead truck levers; live truck levers; suitable connections for said levers; a brake cylinder; a piston therefor; suitable connections for said piston to said live truck levers; a shaft having a pair of arms thereon mounted on said truck, said dead truck levers being connected to said shaft arms; an adjuster cylinder mounted on said truck; a connection for said adjuster cylinder to said brake cylinder, opening into said brake cylinder at a point spaced from its inner end so that the adjuster cylinder is connected with the air supply only when the stroke of the brake piston exceeds a predetermined length; a piston for said adjuster cylinder; a piston rod therefor; a ratchet wheel on said shaft; a pawl lever connected to said piston rod mounted on said shaft; a pawl on said lever coacting with said ratchet; and a detent and ratchet for said shaft.

5. In a structure of the class described, the combination with the brake shoes, of the dead truck levers; live truck levers; suitable connections for said levers; a brake cylinder; a piston therefor; suitable connections for said piston to said live truck levers; a shaft having a pair of arms thereon, said dead truck levers being connected to said shaft arms; an adjuster cylinder; a connection for said adjuster cylinder to said brake cylinder, opening into said brake cylinder at a point spaced from its inner end so that the adjuster cylinder is connected with the air supply only when the stroke of the brake piston exceeds a predetermined length; and a piston for said adjuster cylinder having operating connections with said shaft.

In witness whereof, I have hereunto set my hand and seal in the presence of two witnesses.

LEWIS D. McELROY. [L. S.]

Witnesses:
PHINA WOODRUFF,
L. G. GREENFIELD.

Copies of this patent may be obtained for five cents each, by addressing the "Commissioner of Patents, Washington, D. C."